United States Patent [19]

Ikeda et al.

[11] Patent Number: 5,446,647
[45] Date of Patent: Aug. 29, 1995

[54] CONTROL APPARATUS FOR POWER CONVERTER

[75] Inventors: Katsumi Ikeda; Yushin Yamamoto, both of Kobe, Japan

[73] Assignee: Mitsubishi Denki Kabushiki Kaisha, Tokyo, Japan

[21] Appl. No.: 291,756

[22] Filed: Aug. 17, 1994

[30] Foreign Application Priority Data

Aug. 19, 1993 [JP] Japan .................................. 5-205175

[51] Int. Cl.⁶ ........................................ H02M 3/338
[52] U.S. Cl. ................................. 363/89; 363/127
[58] Field of Search ..................... 307/46, 48, 44, 45, 307/52, 55–56, 64–66, 85–87, 125–127; 363/95, 98, 207, 40–44, 35–37, 39, 44

[56] References Cited

U.S. PATENT DOCUMENTS

| 5,182,463 | 1/1993 | Yamamoto et al. | 307/46 |
| 5,216,585 | 6/1993 | Yasumura | 363/19 |
| 5,349,514 | 9/1994 | Ushiki et al. | 363/21 |

OTHER PUBLICATIONS

Takahashi et al, "High Performance and Long Life Uninterruptible Power Source Using a Flywheel Energy Storage Unit", 1990 IEEE Industry Applications Society Annual Meeting, Seattle, Wash., pp. 1045–1055.

Primary Examiner—Peter S. Wong
Assistant Examiner—Adrtya Krishnow
Attorney, Agent, or Firm—Leydig, Voit & Mayer

[57] ABSTRACT

A device for controlling output voltage of a converter is provided. The input voltage $V_R$ is detected by means of a voltage detecting device and the phase $\Phi$ of the input voltage is detected by means of a phase synchronizing circuit. The detected phase is input to an AC sine wave reference oscillating circuit in order to obtain an AC sine wave reference signal having the same phase as input voltage. The output of an amplitude instruction generating circuit is multiplied by an AC sine wave reference signal by means of a multiplier in order to obtain a converter current instruction $I_A$ *. The input current $I_R$ detected by means of a current detecting device is differentiated by means of an approximation differentiator and only the resonance frequency component is detected by means of a band-pass filter. The detected resonance frequency component is multiplied by a gain K by means of a proportion device and the output os subtracted from the converter current instruction $I_A$ * by means of a subtractor. The current control amplifier and the PWM modulating circuit control a converter so as to make the output from the subtractor agree with the converter current $I_A$ * detected by a current detecting device.

16 Claims, 9 Drawing Sheets

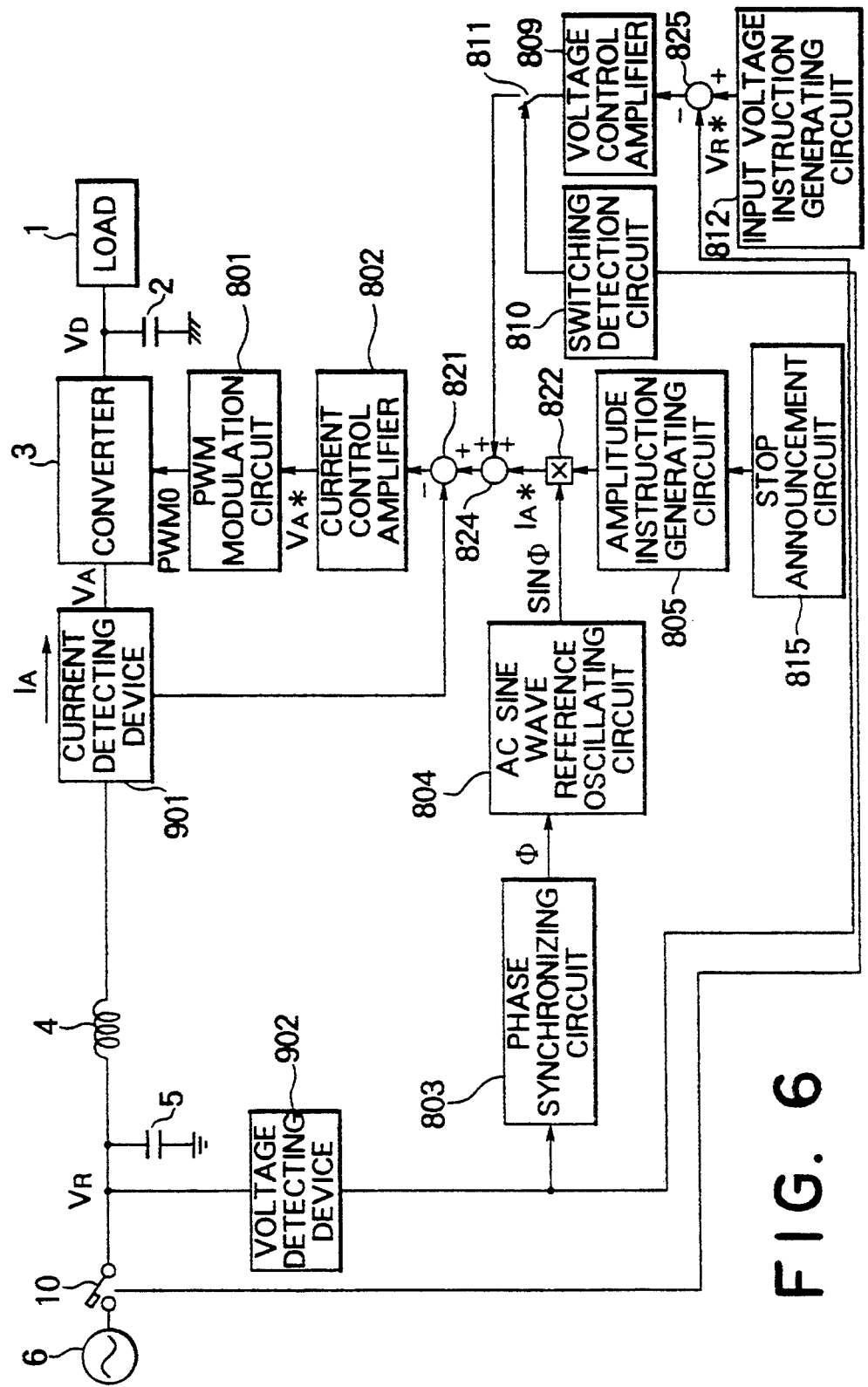
F I G. 6

CONTROL APPARATUS FOR POWER CONVERTER

BACKGROUND OF THE INVENTION

1. Field of the Invention

The present invention relates to a control apparatus for a power converter for controlling the output voltage of the power converter which has a plurality of switching elements in order to obtain DC converted output highly accurately.

2. Description of Related Art

For example, FIG. 9 shows the block connection diagram of a conventional converter control circuit illustrated in High Performance and Long Life Uninterruptable Power Source Using Flywheel Energy Storage Unit, pp. 1049–1055 in a bulletin of IEEE Industry Applications Society Annual Meeting (Oct. 7–12, 1990, Seattle).

Referring to FIG. 9, reference numeral 1 designates a load, numeral 2 designates a capacitor which smooths a DC voltage to be supplied to the load 1, and numeral 3 designates a converter main circuit. The converter main circuit has a single-phase full-bridge structure equipped with switching elements S1–S4, and voltage control diodes D1–D4 as shown in FIG. 10a, in order to perform pulse-width modulation using triangular-wave carrier of 1–2 KHz or more. Numerals 4 and 5 designate a reactor for a filter and a capacitor, respectively, which are provided between an AC power supply 6 and the aforementioned converter 3. Numeral 901 designates a current detecting device which detects converter current $I_A$ and numeral 902 designates a voltage detecting device which detects input voltage $V_R$.

In FIG. 9, the 800 series designate the components of the control apparatus of the aforementioned converter 3. Numeral 801 designates a pulse-width modulating circuit (hereinafter referred to as PWM modulating circuit) which transmits control output PWMO for pulse-width-modulation for controlling the aforementioned converter 3 according to the converter voltage instruction $V_A *$. Numeral 802 designates a current control amplifier which obtains the converter voltage instruction $V_A *$ to be supplied to the aforementioned PWM modulating circuit 801 according to the output of a subtractor 821 which will be described later. Numeral 803 designates a phase synchronizing circuit for obtaining the phase $\phi$ of the AC input $V_R$ according to a voltage detected by a voltage detecting device 902.

Numeral 804 designates an AC sine wave reference oscillating circuit for obtaining an AC sine wave reference signal $\sin \phi$ having the same phase as the input voltage $V_R$ of the AC power supply. Numeral 805 designates an amplitude instruction generating circuit for sending an amplitude instruction. Numeral 821 is a subtractor for obtaining differences between a converter current instruction $I_A *$ obtained by a multiplier 822 which multiplies the AC sine wave reference signal $\sin \phi$ sent from the aforementioned AC sine wave reference oscillating circuit 804 with an amplitude instruction sent from the aforementioned amplitude instruction generating circuit 805 and the converter current $I_A$ detected by the current detecting device 901 in order to transmit a signal representing such difference to the aforementioned current control amplifier 802. These components construct a current control loop.

The operation of the construction described above will be described below.

The input voltage $V_R$ from the AC power supply 6 is detected by means of the voltage detecting device and the phase $\phi$ of the input voltage $V_R$ is detected by means of the phase synchronizing circuit 803. The detected phase is input to the AC sine wave reference oscillating circuit 804 in order to obtain an AC sine wave reference signal $\sin \phi$ having the same phase as the input voltage $V_R$. The multiplier 822 multiplies the output of the amplitude instruction generating circuit 805 and the output of the aforementioned AC sine wave reference oscillating circuit 804 in order to obtain the converter current instruction $I_A *$.

The current control amplifier 802 and the PWM modulating circuit 801 control switching action of the converter 3 to make the converter current instruction $I_A *$ agree with the converter current $I_A$ detected by the current detecting device 901, thereby forming a current control loop. Thus, under normal conditions, power can be supplied to the load 1 from the AC power supply 6 in the form of a sine wave current having a power factor of 1.

The control apparatuses of power converters of the prior art have the construction described above. For this reason, if there is even a slight distortion in input voltage, resonance is produced by the reactance component of this system and the filter capacitor 5. This is a problem of the prior art which must be solved. Further, if the control apparatus is stopped when power is being supplied to the load 1, energy stored in the reactance component of the system or energy stored in the reactor for filter 4 flow into the filter capacitor 5 causing the capacitor 5 be charged with excess voltage. This is another problem to be solved.

SUMMARY OF THE INVENTION

In view of the aforementioned problems of the prior art, an object of the present invention is to provide a control apparatus for a power converter, the control apparatus being capable of restraining a resonance from being produced by the reactance component of the system and the filter capacitor. Another object of the present invention is to provide a control apparatus for a power converter, the control apparatus being capable of restraining excess voltage in a capacitor when the apparatus is stopped.

According to the first aspect of the present invention, there is provided a power converter control apparatus for controlling a power converter comprising; a filter which includes a reactor and a capacitor which are provided between an AC power supply and the power converter; a resonance detecting means which detects a resonance component caused by the system reactor component existing between the AC power supply and the capacitor of the filter; a converter current detecting device which detects a converter current flowing into the power converter through the filter; an input voltage detecting device which detects an input voltage supplied from the AC power supply; a current instruction value generating means which obtains a current instruction value for the power converter according to the voltage detected by the voltage detecting device and an amplitude instruction; a current instruction value control means which changes the current instruction value output from the current instruction value generating means according to a resonance component detected by the resonance detecting means; and a current control means which obtains a voltage instruction value according to the difference between the current instruction value output from the current instruction value control means and a current value detected by the converter current detecting device and then controls switching elements of the power converter according to the voltage instruction value.

According to the second aspect of the present invention, there is provided a power converter control apparatus for controlling a power converter comprising; a filter which includes a reactor and a capacitors provided between an AC power supply and the power converter; a converter current detecting device which detects a converter current flowing into the power converter through the filter; an input voltage detecting device which detects an input voltage supplied from the AC power supply; a current instruction value generating means which obtains a current instruction value for the power converter according to a voltage detected by the voltage detecting device and an amplitude instruction; a current control means which obtains a voltage instruction value according to the difference between a current instruction value output from the current instruction value generating means and a current value detected by the converter current detecting device and then controls switching elements of the power converter according to the voltage instruction value; and a stop announcement circuit which outputs a stop announcement signal to the current instruction value generating means before the apparatus is stopped and controls the current instruction value for the power converter so as to change the value to zero.

According to the third aspect of the present invention, there is provided a power converter control apparatus for controlling a power converter comprising: a filter which includes a reactor and a capacitor provided between an AC power supply and the power converter; a resonance detecting reactor which is provided between the AC power supply and the filter; an input current detecting device which detects input current flowing into the filter through the resonance detecting reactor; a capacitor voltage detecting device which detects the capacitor voltage of the filter; a converter current detecting device which detects converter current flowing into the power converter through the filter; an input current control means which obtains the input current instruction value according to the detected voltage by the input voltage detecting device and the amplitude instruction and then obtains an output in which the current value detected by the input current detecting device is subtracted from the input current instruction value in order to control the input current; a capacitor voltage control means which obtains a capacitor voltage instruction value according to the output of the input current control means and then obtains an output in which the voltage value detected by the capacitor voltage detecting device is subtracted from the capacitor voltage instruction value in order to control the capacitor voltage; a current control means which obtains a converter current instruction value according to the output of the capacitor voltage control means and then controls switching elements of the power converter according to the output in which the current value detected by the converter current detecting device is subtracted from the converter current value in order to control the converter current; and further, a stop announcement circuit which outputs a stop announcement signal to the input current control means before the apparatus is stopped and controls the current instruction value for the power converter so as to change the value to zero.

BRIEF DESCRIPTION OF THE DRAWINGS

FIGS. 3-8 are block diagrams showing the control apparatus for a power converter according to the second seventh embodiments of the present invention, respectively.

DESCRIPTION OF THE PREFERRED EMBODIMENTS

Figure 1:
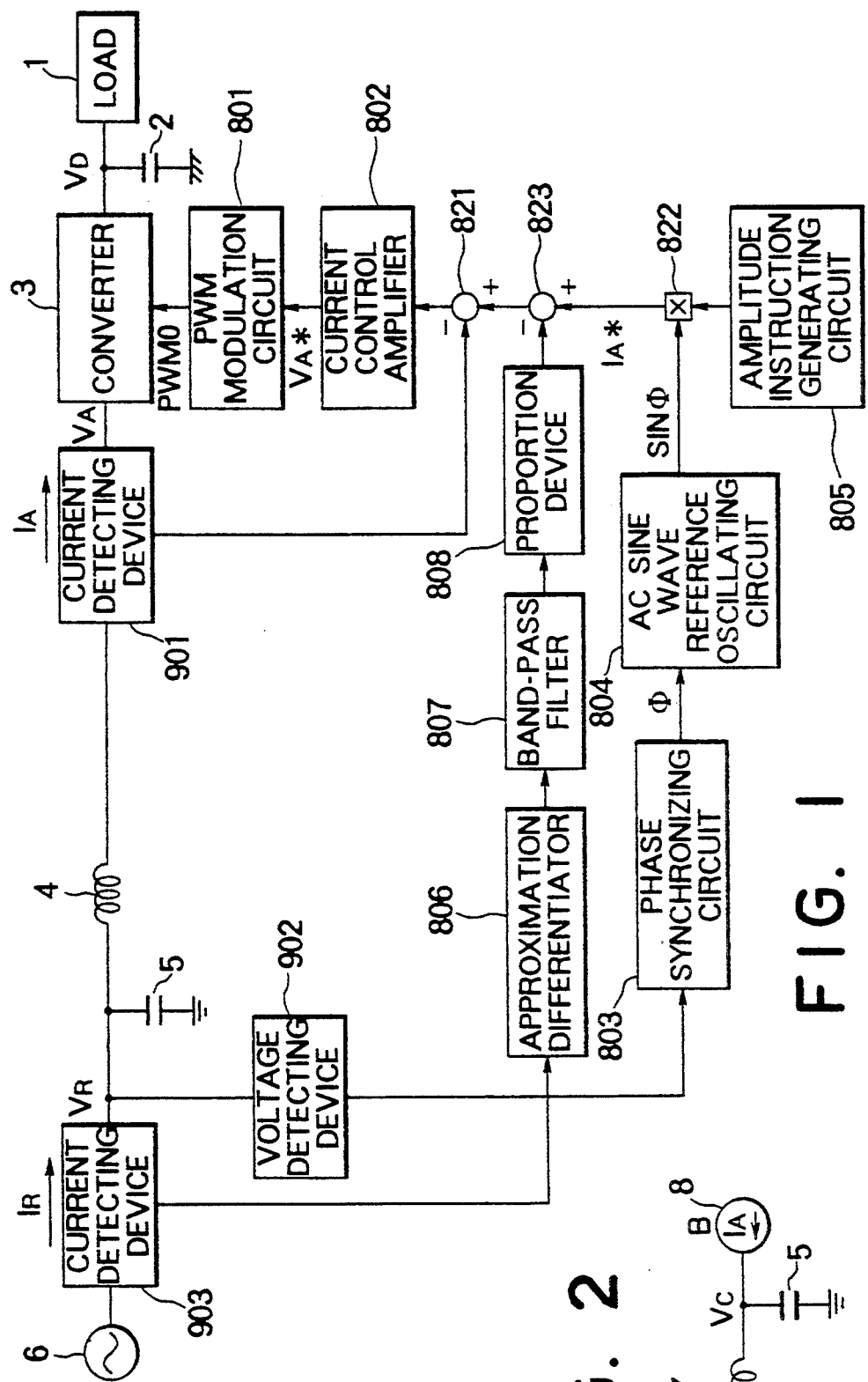
FIG. 1 is a block diagram showing the control apparatus for a power converter according to the first embodiment of the present invention.
Figure 9:
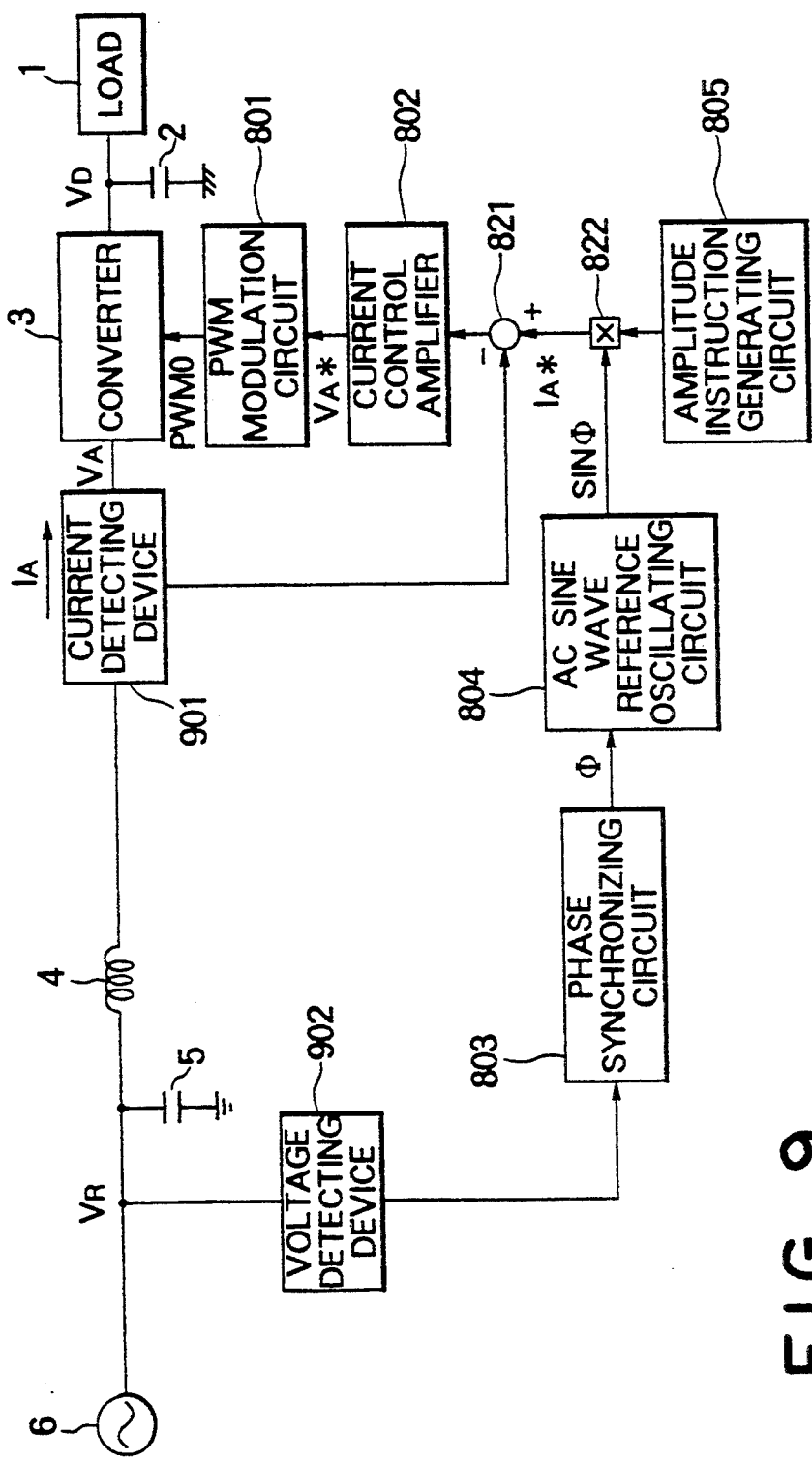
FIG. 9 is a diagram showing the conventional control apparatus for a power converter.

The first embodiment of the present invention will be described below. FIG. 1 is a construction drawing showing the control apparatus for a power converter according to the first embodiment. In FIG. 1, the same reference numerals as in an example of the prior art shown in FIG. 9 designate the same components. In FIG. 1, reference numeral 1 designates a load, numeral 2 designates a capacitor which smooths a DC voltage to be supplied to the load 1, and numeral 3 designates a converter main circuit. Numerals 4 and 5 designate a reactor for a filter and a capacitor, respectively, which are provided between an AC power supply 6 and the aforementioned converter 3. Numeral 901 designates a current detecting device which detects converter current IA and numeral 902 designates a voltage detecting device which detects input voltage $V_R$.

In the same FIG., the 800 series numerals indicate the components of the control apparatus of the aforementioned converter 3. Numeral 801 designates a PWM modulating circuit which transmits control output PWMO for pulse-width-modulation for controlling the aforementioned converter 3 according to the converter voltage instruction $V_A$ *. Numeral 802 designates a current control amplifier which obtains the converter voltage instruction $V_A$* to be supplied to the aforementioned PWM modulating circuit 801 according to the output of a subtractor 821 which will be described later, in order to control the converter current. Numeral 803 designates a phase synchronizing circuit for obtaining the phase $\phi$ of the AC input $V_R$ according to a voltage detected by a voltage detecting device 902.

Numeral 804 designates an AC sine wave reference oscillating circuit for obtaining an AC sine wave reference signal sin $\phi$ having the same phase as the input voltage $V_R$ of the AC power supply. Numeral 805 designates an amplitude instruction generating circuit for sending an amplitude instruction. Numeral 821 is a subtractor for obtaining differences between a converter current instruction $I_A$ * obtained by a multiplier 822 which multiplies the AC sine wave reference signal sin $\phi$ sent from the aforementioned AC sine wave reference oscillating circuit 804 with an amplitude instruction sent from the aforementioned amplitude instruction generating circuit 805 and the converter current $I_A$ detected by the current detecting device 901 in order to transmit a signal representing such difference to the aforementioned current control amplifier 802. These components construct a current control loop.

The construction of the present invention includes, for example, the following novel components. Numeral 903 designates a current detecting device which is provided between the AC power supply 6 and a filter including the reactor 4 and the capacitor 5, and which detects input current $I_R$. As regards the components of the control apparatus, numeral 806 designates an approximation differentiator which differentiates the input current detected by the aforementioned current detecting device 903 and numeral 807 designates a band-pass filter which permits only the resonance frequency band of the input current $I_R$ to pass therethrough according to the output of the approximation differentiator 806. The approximation differentiator 806 and the band-pass filter 807 form a detecting means for detecting resonance current component.

Numeral 808 designates a proportion device for obtaining the output in which the output of the band-pass filter 807 is multiplied by the gain K. Numeral 823 designates a subtractor for obtaining differences between the converter current instruction $I_A$ * obtained by means of the aforementioned multiplier 822 and the output of the aforementioned proportion device 808. The subtractor 823 and the proportion device 808 form a control means for changing current instruction values according to the resonance current component. The aforementioned device builds a current control loop for changing current instructions to the converter 31 so as to make the output of the subtractor 823 agree with the converter current $I_A$ detected by the current detecting device 901 or namely, according to the resonance component of the input current $I_R$.

The operation of the first embodiment described above will be described below.

The input voltage $V_R$ supplied from the AC power supply 6 is detected by means of the voltage detecting device 902 and the phase $\phi$ of the input voltage $V_R$ is detected by means of the phase synchronizing circuit 803. The detected phase $\phi$ is input to the AC sine wave reference oscillating circuit 804 in order to obtain an AC sine wave reference signal $\sin \phi$ having the same phase as the input voltage $V_R$. Then, the multiplier 822 multiplies the output of the amplitude instruction generating circuit 805 by the output of the aforementioned AC sine wave reference oscillating circuit 804 in order to obtain the converter current instruction $I_A$ *.

On the other hand, the input current $I_R$ detected by means of the current detecting device 903 is differentiated by means of the approximation differentiator 806 and the band-pass filter 807 detects only the resonance frequency component. The detected output is multiplied by the gain K by means of the proportion device 808. The output of the proportion device 808 is subtracted from the aforementioned converter current instruction $I_A$ * by means of the subtractor 823. Further, the current control amplifier 802 and the PWM modulating circuit 801 form a current control loop for controlling the switching elements of the converter 3 so as to make the output of the subtractor 823 agree with the converter current $I_A$ detected by means of the current detecting device 901.

Figure 2:
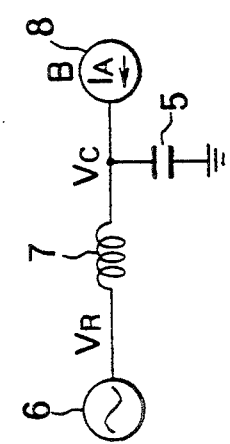
FIG. 2 is a diagram of an equivalent circuit in which the converter 3 and the reactor 4 shown in FIG. 1 are replaced with a power source.

Here, for example, suppose that the converter 3 and the reactor 4 are replaced with a current source. FIG. 2 shows the construction of this case. In FIG. 2, numeral 7 designates a reactor (hereinafter referred to as reactance component 7 as well) which indicates reactance components of the system and numeral 8 designates a current source in which the aforementioned converter 3 and the reactor 4 are replaced therewith. Assuming that the voltage of a capacitor 5, the inductance of a reactor 7 of the system and the capacitance of a capacitor 5 are $V_C$, L and C, respectively, the expressions (1), (2) shown below are established if a transfer function is considered.

$$L(dI_R/dt) = V_R - V_C \quad (1)$$

$$C(dV_c/dt) = I_R + I_A \quad (2)$$

The input voltage $V_R$ can be obtained according to the expressions (1), (2), as follows.

$$V_R = \{LCS^2 - L(I_A/V_c)S + 1\}V_C \quad (3)$$

Where S is Laplace operator.

Referring to FIG. 1, the input current $I_R$ is differentiated by means of the approximation differentiator 806 and the output from the approximation differentiator 806 passes through the band-pass filter 807 and is then multiplied by the gain K by means of the proportion device 808. Next, the output from the proportion device 808 is subtracted from the converter current instruction $I_A$ * by means of the subtractor 823. The converter current $I_A$ flows so as to coincide with the output of the subtractor 823. Thus, assuming that the transfer function of the aforementioned band-pass filter 807 is f(S), the converter current $I_A$ is obtained according to the expression (4) shown below.

$$I_A = KI_R Sf(S) = (K/L)(V_R - V_C)f(S) \quad (4)$$

If the expression (3) is substituted for the expression (4), the input voltage $V_R$ is as follows;

$$V_R = \{LCS^2 - K(V_r/V_C)f(S)S + Kf(S)S + 1\}V_C \quad (5)$$

The aforementioned band-pass filter 807 allows only the resonance current component to pass therethrough. In the frequency band of the resonance current component, the transfer function f(S)=1. In the other frequency band, f(S)=0. Thus, the expression (5) can be expressed as follows.

In the resonance frequency band, the following expression is established.

$$V_c/V_R = (1 + KS)/(LCS^2 + KS + 1) \quad (6)$$

In the other frequency band, the following expression is established.

$$V_C/V_R = 1 + (LCS^2 + 1) \quad (7)$$

Thus, in the resonance frequency band, the power is damped by a selected K value according to the expression (6), thereby restraining resonance from occurring.

Thus, in the control apparatus of the power converter 3 according to the first embodiment described above, the current control loop controls the switching elements of the converter 3 depending upon differences between the value of current flowing to the converter 3 through the filter and the current instruction value so as to make the aforementioned current value agree with the current instruction value. Because the current instruction value of the converter is changed according to the resonance current component of the input current in this current control loop, it is possible to restrain the LC resonance.

Figure 3:
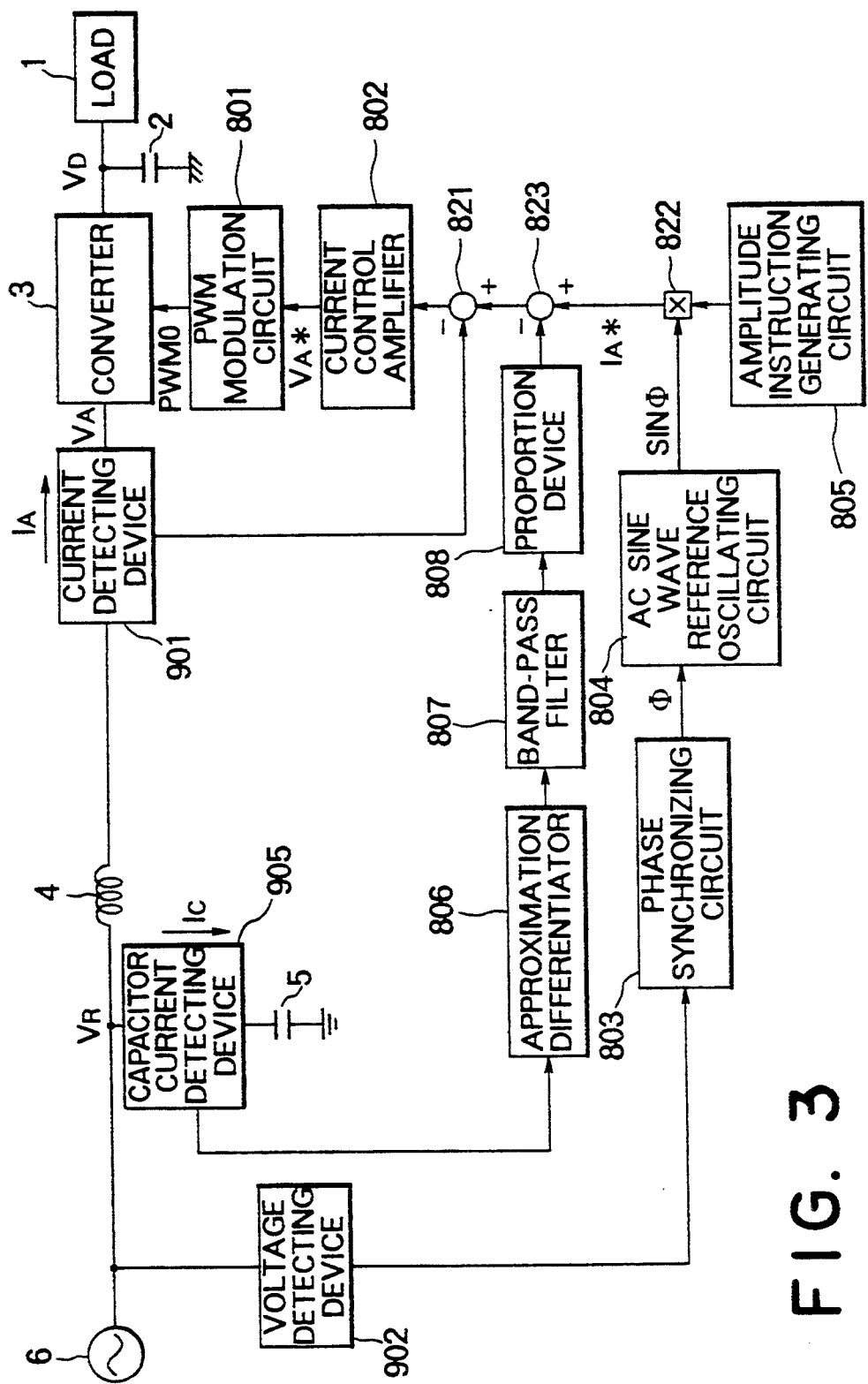

FIG. 3 is a construction diagram showing the control apparatus for a power converter according to the second embodiment. In FIG. 3, the same reference numerals as in the first embodiment shown in FIG. 1 indicate the same components. Thus, the description thereof is omitted here. In the second embodiment, the points different from in the first embodiment are that instead of the current detecting device 903, a current detecting device 905 which detects current flowing into a capacitor 5 which constructs a filter is provided. Capacitor current $I_C$ detected by the current detecting device 905 is input into a differentiator 806 to detect a resonance current component. The current instruction value is changed according to the resonance current component. The other components are the same as in the first embodiment.

Next, the operation of the second embodiment will be described below. In FIG. 3, a resonance current is generated between a reactance component 7 of the system and the capacitor 5 of the filter and the current flows into the capacitor 5. Thus, by detecting the capacitor current $I_C$, it is possible to control the resonance which occurs between the reactance component 7 of the system and the capacitor 5 of the filter. Thus, the capacitor current $I_C$ is detected by the current detecting device 905 and the detected current is differentiated by the approximation differentiator 806. The band-pass filter 807 detects only the resonance frequency component and the proportion device 808 multiplies the resonance frequency component by the gain K. The output of the proportion device 808 is subtracted from the converger current instruction $I_A$ * by means of the subtractor 823.

A current instruction obtained by the subtractor 823 is input into the subtractor 821. In a current control loop, the current control amplifier 802 and the PWM modulating circuit 801 control the switching of switching elements of the converter 3 so as to make the output of the subtractor 823 agree with the converter current $I_A$ detected by the current detecting device 901.

Thus, the construction according to the second embodiment makes it possible to control the resonance which occurs between the reactance component 7 in the system and the capacitor 5 of the filter by detecting the capacitor current $I_C$. Thus, it is possible to reduce the rating of the current detecting device 905 to a smaller value than in the first embodiment in which the resonance caused between the reactance component 7 of the system and the capacitor 5 of the filter is controlled by detecting the input current $I_R$. For this reason, the second embodiment has an effect of reducing operating cost as well as the effect of the first embodiment.

Figure 4:
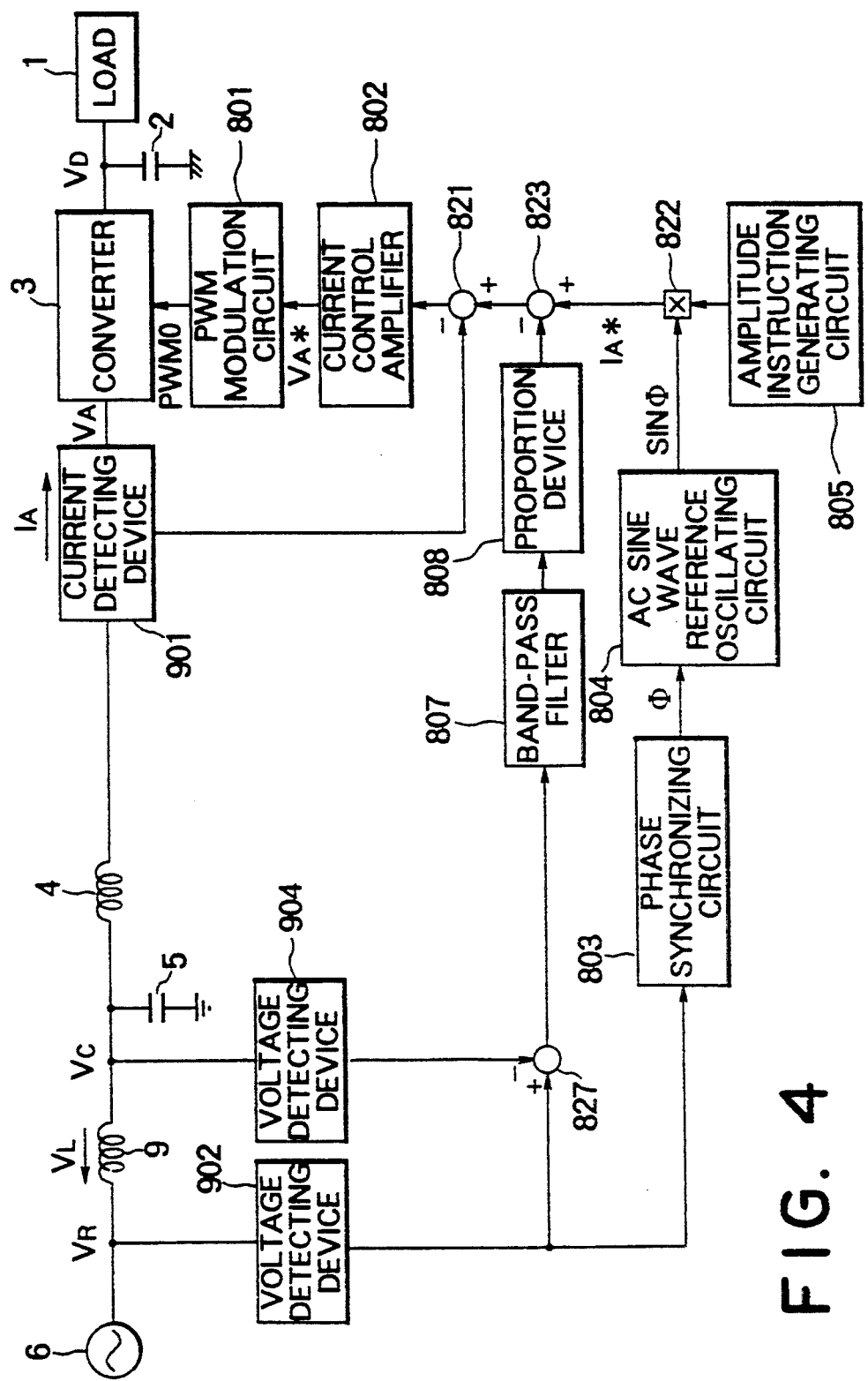

FIG. 4 is a construction diagram showing the control apparatus for a power converter according to the third embodiment. In FIG. 4 the same reference numerals as in the first embodiment shown in FIG. 1 indicate the same components. Thus, the description thereof is omitted here. In the third embodiment, the points different from in the first embodiment are that; a reactor 9 is provided between the AC power supply 6 and the filter; a voltage detecting device 904 for detecting the capacitor voltage $V_C$ is provided; a subtractor 827 which inputs the output obtained by subtracting the capacitor voltage $V_C$ detected by the aforementioned voltage detecting device 904 from the input voltage $V_R$ detected by the voltage detecting device 902 into the band-pass filter 807 is provided, the approximation differentiator 806 is eliminated and the current detecting device 903 for detecting the input current $I_R$ is eliminated. The other components are the same as in the first embodiment.

Usually, because the reactance component 7 of the system is often unknown it is not possible to specify a resonance frequency. Thus, according to the construction shown in FIG. 4, a reactor 9 which has a sufficiently larger capacity than the reactance component in the system is added to the apparatus and then a voltage $V_L$ applied to the reactor 9 is obtained by subtracting the capacitor voltage $V_C$ detected by the voltage detecting device 904 from the input voltage $V_R$ detected by the voltage detecting device 902 by means of the subtractor 827. Because the $V_L$ applied to the reactor 9 is differentiated input current $I_R$, it is possible to obtain the differentiated value of the input current $I_R$ without using the approximation differentiator utilized in the first embodiment.

The band-pass filter 807 detects only the resonance frequency component from the output of the subtractor 827 and the proportion device 808 multiplies the detected component by the gain K. Then the output of the proportion device 808 is subtracted from the converter current instruction $I_A$ * by means of the subtractor 823. The current control amplifier 802 and the PWM modulating circuit 801 form a current control loop in which the switching of the converter 3 is controlled so as to make the output of the subtractor 823 agree with the converter current $I_A$ detected by means of the current detecting device 901.

Thus, the construction according to the third embodiment makes it possible to limit the resonance frequency by adding the reactor 9 between the AC power supply and the filter. Further, the necessity of the approximation differentiator is eliminated by obtaining the voltage $V_L$ applied to the reactor 9, thereby facilitating designing of the resonance control system. Namely, because the resonance component is detected according to the reactor voltage and the converter current instruction is changed depending on the resonance component, the present embodiment has an effect of being capable of building up the control apparatus easily as well as the effect of the first embodiment.

Figure 5:
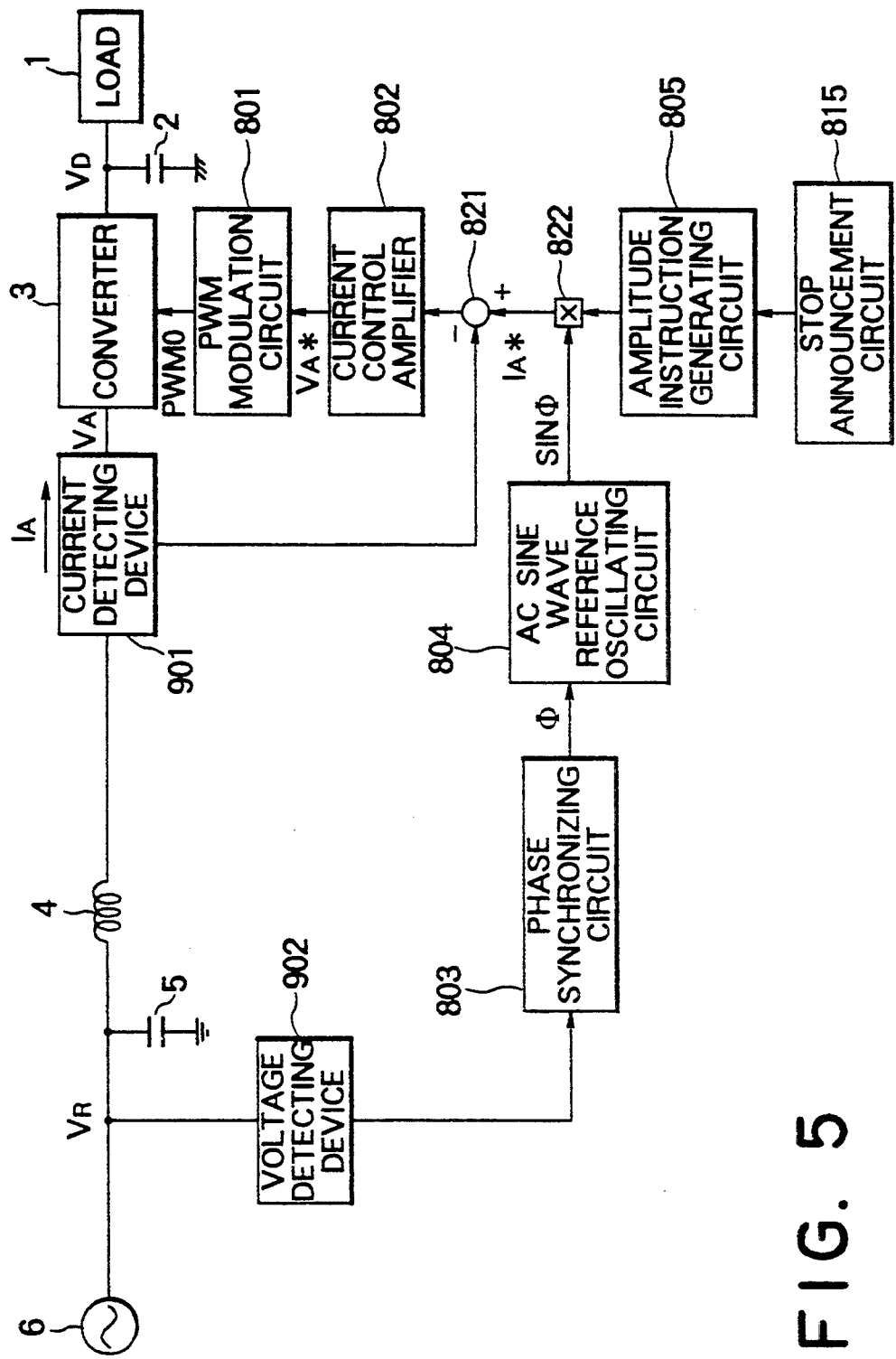

FIG. 5 is a construction diagram showing the control apparatus for a power converter according to the fourth embodiment. In FIG. 5, the same reference numerals as in the first embodiment shown in FIG. 1 indicate the same components. Referring to FIG. 5, reference numeral 1 designates a load, numeral 2 designates a capacitor for smoothing DC voltage to be supplied to the load 1, and numeral 3 designates a converter main circuit. Numerals 4, 5 designate a reactor for a filter and a capacitor, respectively, which are provided between the AC power supply 6 and the aforementioned converter 3. Numeral 901 designates a current detecting device for detecting a converter current $I_A$ and numeral 902 designates a voltage detecting device for detecting an input voltage VR.

In the same FIG., the 800 series numerals indicate the components of the control apparatus of the aforementioned converter 3. Numeral 801 designates a PWM modulating circuit which transmits the control output PWMO for pulse-width-modulation for controlling the aforementioned converter 3 according to the converter voltage instruction $V_A$ *. Numeral 802 designates a current control amplifier which obtains the converter voltage instruction $V_A^*$ to be supplied to the aforementioned PWM modulating Circuit 801 according to the output of a subtractor 821 which will be described later, in order to control the converter current. Numeral 803 designates a phase synchronizing circuit for obtaining the phase $\phi$ of the AC input $V_R$ according to a voltage detected by a voltage detecting device 902.

Numeral 804 designates an AC sine wave reference oscillating circuit for obtaining an AC sine wave reference signal sin $\phi$ having the same phase as the input voltage $V_R$ of the AC power supply. Numeral 805 designates an amplitude instruction generating circuit for sending an amplitude instruction. Numeral 821 is a subtractor for obtaining differences between a converter current instruction $I_A^*$ obtained by a multiplier 822 which multiplies the AC sine wave reference signal sin $\phi$ sent from the aforementioned AC sine wave reference oscillating circuit 804 by an amplitude instruction sent from the aforementioned amplitude instruction generating circuit 805 and the converter current $I_A$ detected by the current detecting device 901 in order to transmit a signal representing such difference to the aforementioned current control amplifier 802. These components construct a current control loop.

The construction of the present invention includes the following novel components. Numeral 815 designates a stop announcement circuit which transmits a stop announcement signal to an amplitude instruction generating circuit 805 before the control apparatus stops to zero the converter current and which stops the control apparatus in order to prevent the capacitor 5 from being loaded with excess voltage after the converter 3 absorbs energy stored in the reactance component 7 in the system and energy stored in the reactor 4 of the filter.

The operation of the fourth embodiment described above will be described below.

The input voltage VR supplied from the AC power supply 6 is detected by means of the voltage detecting device 902 and the phase of the input voltage $V_R$ is detected by means of the phase synchronizing circuit 803. The detected phase $\phi$ is input to the AC sine wave reference oscillating circuit 804 to obtain an AC sine wave reference signal sin $\phi$ having the same phase as the input voltage $V_R$. Then, the multiplier 822 multiplies the output of the amplitude instruction generating circuit 805 by the output of the aforementioned AC sine wave reference oscillating circuit 804 to obtain the converter current instruction $I_A^*$.

The current control amplifier 802 and the PWM modulating circuit 801 form a current control loop which controls switching of the converter 3 so as to make the converter current instruction $I_A^*$ agree with the converter current $I_A$ detected by means of the current detecting device 901. Thus, under normal conditions, power can be supplied to the load 1 from the AC power supply 6 in the form of a sine wave current having a power factor of 1.

When the control apparatus is stopped during supplying of power to the load 1, the stop announcement circuit 815 outputs a stop announcement signal to an amplitude instruction generating circuit 805 before the apparatus is stopped. Consequently, the amplitude instruction generating circuit 805 outputs zero. When the output of the amplitude instruction generating circuit 805 becomes zero, the converter current instruction $I_A^*$ becomes zero. As a result, the converter current $I_A$ becomes zero and then the control apparatus is stopped.

When the apparatus is stopped after the converter current $I_A$ is zeroed, the converter 3 absorbs energy stored in the reactance component 7 in the system and energy stored in the reactor 4 of the filter during supplying of power to the load 1 before the apparatus is stopped. Namely, the control apparatus is stopped after the converter 3 absorbs energy stored in the reactance component 7 in the system and energy stored in the reactor 4 of the filter. Consequently, the energies do not flow into the capacitor 5, so that the capacitor 5 is not loaded with excess voltage.

Thus, according to the fourth embodiment, the stop announcement circuit 815 transmits a stop announcement signal to the amplitude instruction generating circuit 805 before the apparatus is stopped. As a result, the apparatus is stopped after the converter current becomes zero and then the converter absorbs energy stored in the reactance component 7 in the system and energy stored in the reactor 4 of the filter. Thus, the present embodiment has an effect of preventing the capacitor 5 from being loaded with excess voltage.

FIG. 6 is a construction diagram showing the control apparatus for a power converter according to the fifth embodiment. In FIG. 6, the same reference numerals as in the fourth embodiment shown in FIG. 5 indicate the same components. Thus, the description thereof is omitted here. In the fifth embodiment, the points different from the fourth embodiment are that a switch 10 for shutting the apparatus off from the system, a switching detection circuit 810 for detecting whether the switch 10 is open, a switch 811 which is turned on by the output of the switching detection circuit 810 and an input voltage instruction generating circuit 812 which generates an input voltage instruction $V_R^*$ are added to the system.

Further, the points of the fifth embodiment different from the fourth embodiment are that a subtractor 825 which subtracts a voltage detected by the voltage detecting device 902 from the input voltage instruction $V_R^*$ input from the aforementioned input voltage instruction generating circuit 812, a voltage control amplifier 809 which outputs control current according to the output of the aforementioned subtractor 825 in order to control the input voltage and an adder 824 which adds the output of the aforementioned voltage control amplifier 809 to the output of the multiplier 822 to input the result into the subtractor 821 are added to the system.

Next, the operation of the control apparatus having the construction described above will be described below.

Referring to FIG. 6, when the control apparatus is stopped during supplying of power to the load 1, the stop announcement circuit 815 outputs a stop announcement signal to an amplitude instruction generating circuit 805 before the apparatus is stopped. Consequently, the amplitude instruction generating circuit 805 outputs zero and the converter current instruction $I_A^*$ becomes zero. As a result, the converter current $I_a$ becomes zero and then the control apparatus is stopped.

When the apparatus is stopped, the converter 3 absorbs energy stored by the reactance component 7 in the system and energy stored in the reactor 4 of the filter during supplying of power to the load 1 before the apparatus is stopped. At this time, because the capacitor 5 of the filter is connected to the system, the system charges the capacitor 5.

When the switch 10 is open, the apparatus is separated from the system and the switching detection circuit 810 detects that the switch 10 is open. Consequently, the switch 811 is turned on by the output of the switching detection circuit 810. When the switch 811 is turned on, the voltage control amplifier 809 is controlled so as to make the input voltage instruction $V_R$* from the input voltage instruction generating circuit 812 agree with the input voltage $V_R$ detected by the voltage detecting device 902. Then, the output of the aforementioned voltage control amplifier 809 is added to a converter current instruction $I_A$* output from the multiplier 822 by means of the adder 824 to obtain a new converters current instruction.

The current control amplifier 802 and the PWM modulating circuit 801 form a current control loop which controls the switching operation of the converter 3 according to the output of the subtractor 821 so as to make this new converter current instruction agree with the converter current IA detected by the current detecting device 901. Thus, a voltage applied to the capacitor 5 is controlled to prevent the capacitor 5 from being loaded with excess voltage.

Thus, according to the fifth embodiment, before the apparatus is stopped, the stop announcement circuit 815 transmits a stop announcement signal to the amplitude instruction generating circuit 805 to zero the converter current. After this action, the voltage applied to the capacitor 5 is controlled. As a result, the present embodiment has an effect of preventing the capacitor 5 from being loaded with excess voltage.

Figure 7:
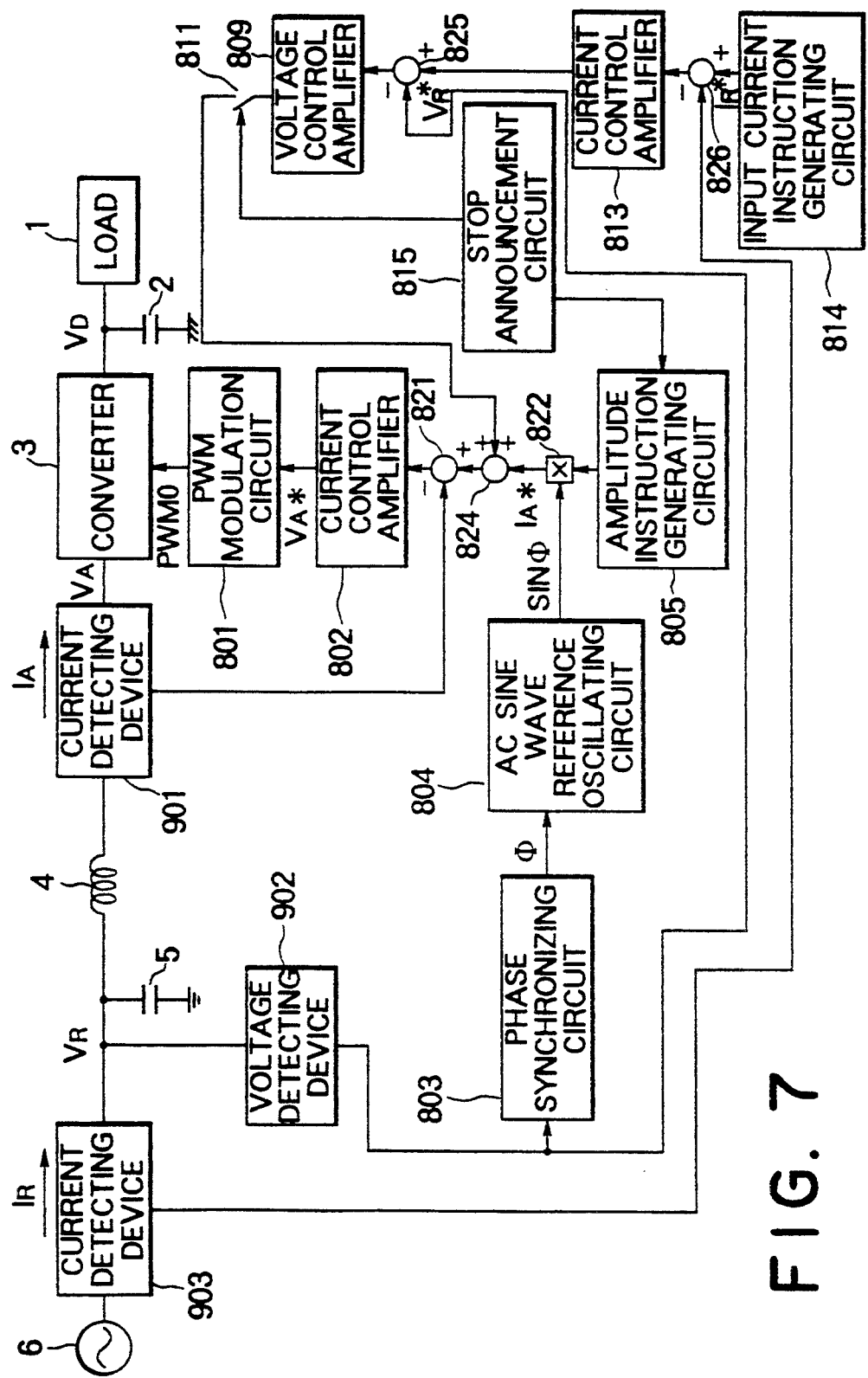

FIG. 7 is a construction diagram showing the control apparatus for a power converter according to the sixth embodiment. In FIG. 7, the same reference numerals as in the fifth embodiment shown in FIG. 6 indicate the same components. Thus, the description thereof is omitted here. The points of the sixth embodiment different from the fifth embodiment are that a current control amplifier 813 for obtaining the input voltage instruction $V_R$* according to the output from the aforementioned subtractor 826 in order to control the input current, an input current instruction generating circuit 814 which generates the input current instruction $I_R$* for zero current, and a subtractor 826 which subtracts the input current $I_R$ detected by the current detecting device 903 from the input current instruction $I_R$* sent from the input current instruction generating circuit 814 are added to the system. Further, the points of the present embodiment different from the fifth embodiment are that the switch 10 and the switching detection circuit 810 are eliminated and that the switch 811 which is turned on according to a stop announcement signal of the stop announcement circuit 815 is added to the system. The other construction is the same as in the fifth embodiment.

Next, the operation of the apparatus having the construction described above will be described below.

Referring to FIG. 7, the switch 811 is turned on according to a stop announcement signal sent from the stop announcement circuit 815 before the apparatus is stopped. When the switch 811 is turned on, the current control amplifier 813 controls power so as to make the input current instruction $I_R$* sent from the input current instruction generating circuit 814 which outputs zero current instructions agree with the input current $I_R$ detected by means of the current detecting device 903.

Then, the subtractor 825 subtracts the input voltage of the voltage detecting device 902 from the output of the current control amplifier 813 and according to the output, the voltage control amplifier 809 transmits control current to the adder 824. The adder 824 adds the output of the aforementioned voltage control amplifier 809 to the converter current instruction $I_a$* output from the multiplier 822 in order to obtain a new converter current instruction.

The current control amplifier 802 and the PWM modulating circuit 801 form a current control loop which controls the switching of the converter 3 according to the output of the subtractor 821 so as to make this new converter current instruction agree with the converter current $I_A$ detected by the current detecting device 901. According to this system, the apparatus is stopped after the input current $I_R$ is zeroed. Thus, even if the apparatus is not separated from the system, the capacitor 5 is not charged from the system. When the apparatus is stopped, the capacitor 5 is not loaded with excess voltage.

Thus, according to the sixth embodiment described above, before the apparatus is stopped, the stop announcement circuit 815 transmits a stop announcement signal to zero the input current, thereby stopping the apparatus. Even if the apparatus is not separated from the system, the capacitor 5 is not charged. When the apparatus is stopped, the capacitor 5 is not loaded with excess voltage.

Figure 8:
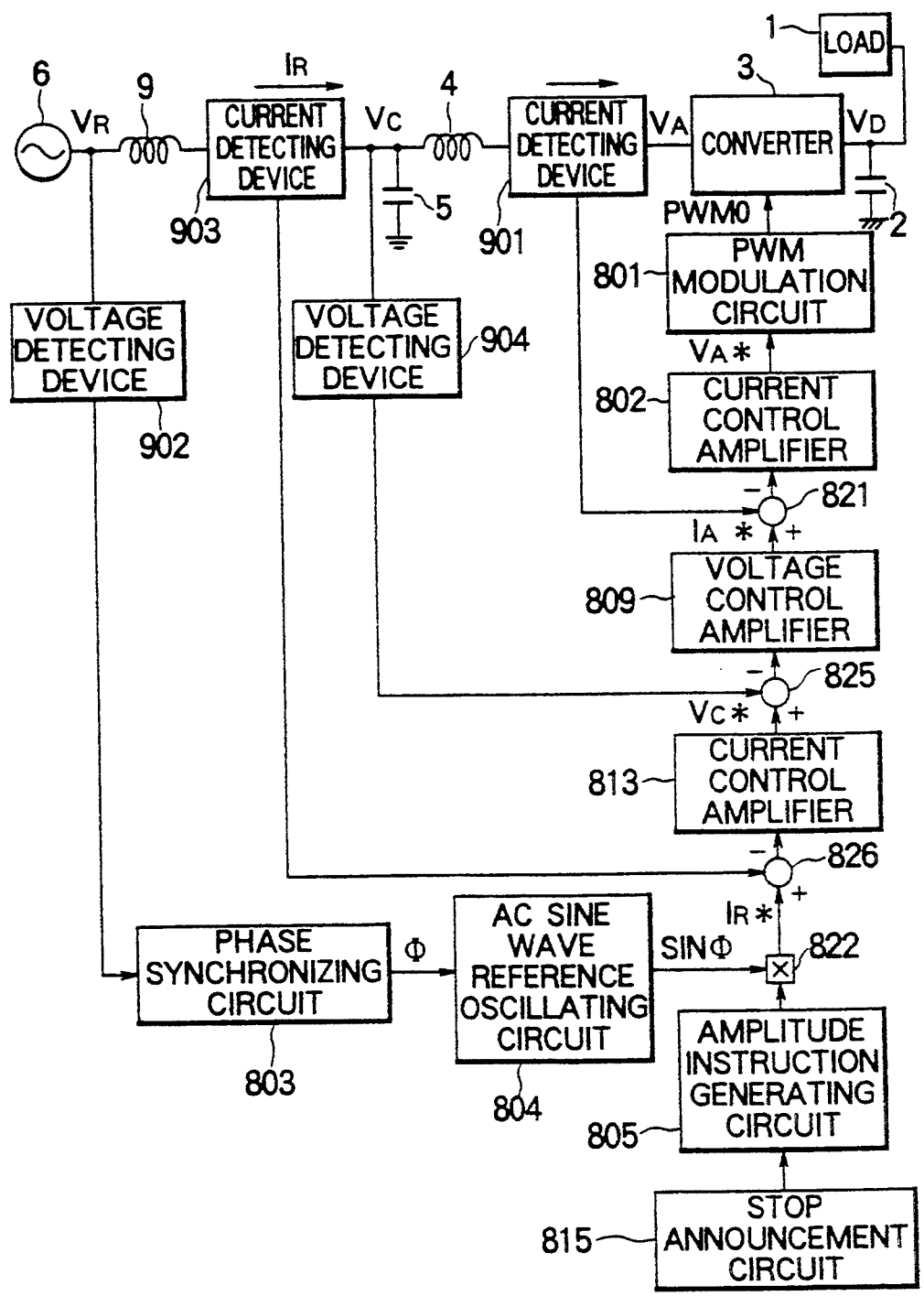

FIG. 8 is a construction drawing showing the control apparatus for a power converter according to the seventh embodiment. In FIG. 8, reference numeral 1 designates a load, numeral 2 designates a capacitor which smooths a DC voltage to be supplied to the load 1, and numeral 3 designates a converter main circuit. Numerals 4 and 5 designate a reactor for a filter and a capacitor, respectively, which are provided between an AC power supply 6 and the aforementioned converter 3. Numeral 901 designates a current detecting device which detects the converter current $I_a$ and numeral 902 designates a voltage detecting device which detects the input voltage $V_R$. Numeral 903 designates a current detecting device which is provided between the AC power supply 6 and the filter built by a reactor 4 and a capacitor 5 in order to detect the input current $I_R$ and numeral 904 designates a voltage detecting device which detects a capacitor voltage of the filter.

In the same FIG., the 800 series numerals indicate the components of the control apparatus of the aforementioned converter 3. Numeral 801 designates a PWM modulating circuit which transmits control output PWMO for pulse-width-modulation for controlling the aforementioned converter 3 according to the converter voltage instruction $V_A$*. Numeral 802 designates a current control amplifier which obtains the converter voltage instruction $V_A$* to be supplied to the aforementioned PWM modulating circuit 801 according to the output of a subtractor 821 which will be described later, in order to control the converter current. Numeral 803 designates a phase synchronizing circuit for obtaining the phase $\phi$ of the AC input $V_R$ according to a voltage detected by a voltage detecting device 902.

Numeral 804 designates an AC sine wave reference oscillating circuit for obtaining an AC sine wave reference signal sin $\phi$ having the same phase as the input voltage $V_R$ of the AC power supply. Numeral 805 designates an amplitude instruction generating circuit for sending an amplitude instruction, the circuit transmitting zero output when a stop announcement signal is transmitted from a stop announcement circuit 815 which will be described later. Numeral 809 designates a voltage control amplifier which outputs the converter current instruction $I_A$ * according to the output of the subtractor described later in order to control the capacitor voltage $V_C$. Numeral 813 designates a current control amplifier which obtains the capacitor voltage instruction $V_C$ * according to the output from the subtractor described later in order to control the input current $I_R$.

Numeral 815 designates a stop announcement circuit which transmits a stop announcement signal to the amplitude instruction generating circuit 805 before the apparatus is stopped, in order to zero the input current instruction $I_R$ *. Consequently, when the apparatus is stopped, the capacitor 5 is prevented from being loaded with excess voltage. Numeral 821 designates a subtractor which obtains differences between the converter current instruction $I_A$ * obtained by the aforementioned current control amplifier 809 and the converter current $I_A$ detected by the current detecting device 901 to send a signal representing such difference to the aforementioned current control amplifier 802.

Numeral 822 designates a multiplier for obtaining the input current instruction $I_R$ * by multiplying an AC sine wave reference signal sin φ sent from the AC sine wave reference oscillating circuit 804 by an amplitude instruction sent from the amplitude instruction generating circuit 805 in order to obtain the input current instruction $I_R$ *. Numeral 825 designates a subtractor which subtracts a voltage value detected by the voltage detecting device 902 from a capacitor voltage instruction $V_C$ sent from the current control amplifier 813. Numeral 826 designates a subtractor which subtracts an input current $I_R$ detected by the current detecting device 903 from the input current instruction $I_R$ sent from the multiplier 822.

Then, the operation of the apparatus according to the seventh embodiment will be described below. Referring to FIG. 8, the control apparatus comprises a current minor loop which controls a converter current $I_A$, a voltage minor loop which controls a capacitor voltage $V_C$ and a current control loop which controls an input current $I_R$. The input voltage $V_R$ is detected by means of the voltage detecting device 902 and the phase the input voltage $V_r$ is detected by means of the phase detecting circuit 803. The detected phase φ is input to the AC sine wave reference oscillating circuit 804 As a result, the AC sine wave reference signal sin φ having the same phase as that of the voltage $V_R$ is obtained.

The multiplier 822 multiplies the output of the aforementioned AC sine wave reference oscillating circuit 804 by the output of the amplitude instruction generating circuit 805 and outputs the input current instruction $I_R$ *. The current control amplifier 813 operates according to the output of the subtractor 826 which obtains differences between the input current instruction $I_R$ * which is the output of the aforementioned multiplier 822 and the input current $I_R$ detected by the current detecting device 901 and outputs the capacitor voltage instruction $V_C$ * so as to zero the difference, thereby controlling the input current $I_R$.

The capacitor voltage instruction $V_C$ * which is the output of the aforementioned current control amplifier 813 is input to the subtractor 825. The subtractor 825 obtains a difference between the capacitor voltage instruction $V_C$* and the capacitor voltage $V_C$ detected by the voltage detecting device 904. The output of the subtractor 825 is input to the voltage control amplifier 809. The voltage control amplifier 809 outputs the converter current instruction $I_A$ * so as to zero the difference between the capacitor voltage instruction $V_C$ * which is the output of the current control amplifier 813 and the capacitor voltage $V_c$ detected by the voltage detecting device 904, thereby controlling the capacitor voltage $V_C$.

The converter current instruction $I_A$ * which is the output of the aforementioned voltage control amplifier 809 is input to a subtractor 821. The subtractor 821 obtains a difference between the converter current instruction $I_A$ * and the converter current instruction detected by the current detecting device 901. The output of the subtractor 821 is input to the current control amplifier 802. The current control amplifier 802 outputs the converter voltage instruction $V_A$ * so as to zero a difference between the converter current instruction $I_A$ * which is the output of the voltage control amplifier 809 and the converter current $I_A$ detected by the current detecting device 901, thereby controlling the converter current $I_a$. Then, the converter voltage instruction $V_A$ * which is the output of the current control amplifier 802 is supplied to the PWM modulating circuit 801 and the output of the PWM modulating circuit 801 controls the switching of the converter 3.

According to the seventh embodiment described above, under normal conditions, power can be supplied to the load 1 from the AC power supply 6 in the form of a sine wave current having a power factor of 1. The input current instruction $I_R$ * is a sine wave and the current control amplifier 813 can respond more quickly than the resonant frequency produced by the reactor 9 and the capacitor 5. Thus, it is possible to control the resonance produced by the reactor 9 and the capacitor 5.

When the control apparatus is stopped during supplying of power to the load 1, the stop announcement circuit 815 outputs a stop announcement signal. When the stop announcement circuit 815 outputs the stop announcement signal, the amplitude instruction generating circuit 805 outputs zero. If the output of the amplitude instruction generating circuit 805 becomes zero, the input current instruction $I_R$ * becomes zero. If the input current instruction $I_R$ * becomes zero, the input current $I_R$ becomes zero, thereby stopping the apparatus. Because the apparatus is stopped after the input current becomes zero, the capacitor 5 is not charged from the system even if the apparatus is not separated from the system. When the apparatus is stopped, the capacitor 5 is not loaded with excess voltage.

According to the seventh embodiment described above, the current instruction value of the current control loop which controls current flowing through the converter 3 is changed according to the resonance component produced by the reactor component in the system and the capacitor 5 of the filter, and the current flowing through the converter 3 is controlled to zero before the apparatus is stopped. Thus, the present embodiment makes it possible to prevent resonance and further prevents the capacitor 5 of the filter from being loaded with excess voltage when the apparatus is stopped.

Figure 10A:
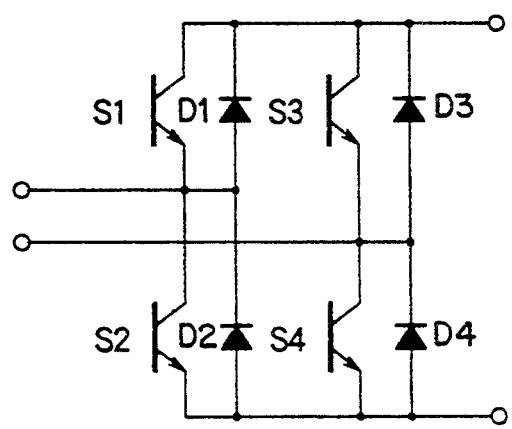
FIGS. 10a and 10b are circuit diagrams showing an example of the construction of a power converter.
Figure 10B:
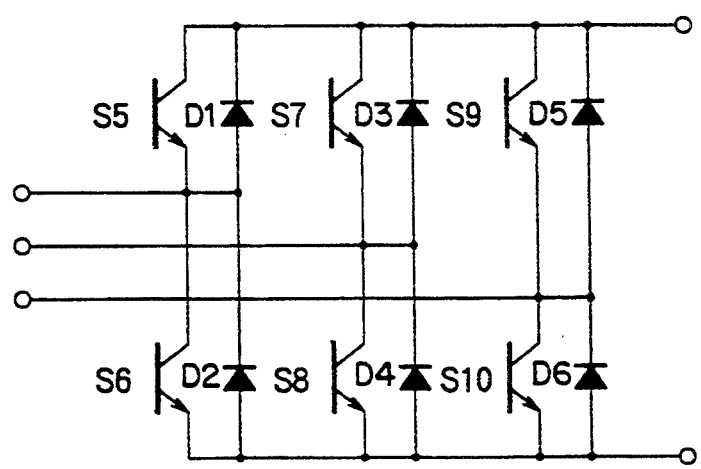

The respective embodiments described above refer to a converter 3 for a single phase. The embodiments are applicable to three-phase full-bridge construction converter having the switching elements S5–S10 and voltage control diodes D1–D6 as shown in FIG. 10b.

The advantages of the respective embodiments will be described below. According to the first embodiment, the converter current instruction is changed according to the resonance component of input current, thereby restraining LC resonance.

According to the second embodiment, the converter current instruction is changed according to the resonance component of the capacitor current. Thus, the second embodiment has an effect of reducing operating cost as well as the effect of the first embodiment.

According to the third embodiment, the converter current is changed by the reactor voltage according to the resonance component. Thus, in addition to the effect of the first embodiment, it is possible to easily build up a control circuit.

According to the fourth embodiment, by zeroing the converter current before the apparatus is stopped, the converter absorbs energy stored in the reactance component of the system and energy stored in the reactor of the filter before the apparatus is stopped. Thus, the capacitor is prevented from being loaded with excess voltage.

According to the fifth embodiment, the apparatus is separated from the system before the apparatus is stopped, thereby controlling voltage applied to the capacitor. Thus, the capacitor is prevented from being loaded with excess voltage.

According to the sixth embodiment, the input current is zeroed before the apparatus is stopped. Thus, even if the apparatus is not separated from the system, the capacitor is not charged from the system. When the apparatus is stopped, the capacitor is not loaded with excess voltage.

According to the seventh embodiment, by controlling the input current, it is possible to build up the circuit in addition to the effects of the third and sixth embodiments.

What is claimed is:

1. A power converter control apparatus for controlling a power converter which has a plurality of switching elements and converts AC current to DC current to supply DC output to a load, said control apparatus comprising:
    a filter which includes a reactor and a capacitor provided between an AC power supply and said power converter;
    a resonance detecting means which detects a resonance component caused by a system reactor component existing between said AC power supply and said capacitor of said filter said resonance detecting means being connected to said AC power supply;
    a converter current detecting device which detects a converter current flowing into said power converter through said filter;
    an input voltage detecting device which detects an input voltage supplied from said AC power supply;
    a current instruction value generating means which obtains a current instruction value for said power converter according to the voltage detected by said input voltage detecting device and an amplitude instruction;
    a current instruction value control means which changes said current instruction value output from said current instruction value generating means according to the resonance component detected by said resonance detecting means; and
    a current control means which obtains a voltage instruction value according to the difference between said current instruction value output from said current instruction value control means and a current value detected by said converter current detecting device, and transmits a control output for pulse-width modulation according to said voltage instruction value to said power converter for controlling said plurality of switching elements to provide the DC output to said load.

2. A control apparatus according to claim 1 wherein said resonance detecting means comprises:
    an input current detecting device which detects an input current from said AC power supply;
    a differentiator which differentiates the current detected by said input current detecting device; and
    a band-pass filter which passes the output of said differentiator therethrough to obtain the resonance frequency component of the input current.

3. The control apparatus according to claim 1 wherein said resonance detecting means comprises:
    a capacitor current detecting device which detects the current flowing from said AC power supply into said filter capacitor;
    a differentiator which differentiates the current detected by said capacitor current detecting device; and
    a band-pass filter which passes the output of said differentiator therethrough to obtain the resonance frequency component of the input current.

4. The control apparatus according to claim 1 wherein said resonance detecting means comprises:
    a reactor for detecting resonance which is provided between said AC power supply and said filter;
    a capacitor voltage detecting device which detects the capacitor voltage of said filter;
    a subtractor which subtracts the voltage detected by said capacitor voltage detecting device from a voltage detected by said input voltage detecting device to obtain a voltage applied to said reactor; and
    a band-pass filter which passes the output of said subtractor therethrough to obtain the resonance frequency component of input current.

5. The control apparatus according to claim 1 wherein said current instruction value generating means comprises:
    an amplitude instruction generating circuit which generates an amplitude instruction for current output from said power converter;
    a phase synchronizing circuit which obtains the phase of AC input according to voltage detected by said input voltage detecting device;
    an AC sine wave reference oscillating circuit which generates an AC sine wave reference signal having the same phase as said AC input; and
    a multiplier which multiplies said AC sine wave reference signal sent from said AC sine wave reference oscillating circuit by said amplitude instruction sent from said amplitude instruction generating circuit in order to generate a current instruction value.

6. The control apparatus according to claim 1 wherein said current instruction value control means comprises:
    a proportion device which obtains an output in which the output detected by said resonance detecting means is multiplied by a predetermined gain; and a subtractor which obtains the difference between the current instruction value output from said current instruction generating means and the output of said proportion device.

7. The control apparatus according to claim 1 wherein said current control means comprises:
a subtractor which obtains the difference between the current instruction value output from said current instruction value control means and the current value detected by said converter current detecting device;
a current control amplifier which obtains the voltage instruction value according to the output of said subtractor in order to control the converter current; and
a pulse-width modulating control circuit transmits the control output for pulse-width-modulation for controlling said power converter according to the voltage instruction value output from said current control amplifier.

8. A power converter control apparatus for controlling a power converter which has a plurality of switching elements and converts AC current to DC current to supply DC output to a load, said control apparatus comprising:
a filter which includes a reactor and a capacitor provided between an AC power supply and said power converter;
a converter current detecting device which detects a converter current flowing into said power converter through said filter;
an input voltage detecting device which detects an input voltage supplied from said AC power supply;
a current instruction value generating means which obtains a current instruction value for said power converter according to a voltage detected by said voltage detecting device and an amplitude instruction;
a current control means which obtains a voltage instruction value according to the difference between a current instruction value output from said current instruction value generating means and the current value detected by said converter current detecting device and transmits a control output for pulse width modulation according to said voltage instruction value to said power converter for controlling said plurality of switching elements to provide the DC output to said load; and
a stop announcement circuit which outputs a stop announcement signal to said current instruction value generating means before said apparatus is stopped and controls the current instruction value for said power converter so as to change said current instruction value to zero.

9. The control apparatus according to claim 8 further comprising:
a switch which separates said AC power supply from said control apparatus;
a switching detection circuit which detects whether said switch is open;
an input voltage instruction generating circuit which generates an input voltage instruction;
a subtractor which subtracts the voltage value detected by said input voltage detecting device from the input voltage value sent from said input voltage instruction generating circuit; and
a voltage control amplifier which outputs a control current according to the output of said subtractor in order to control the input voltage and an adder which adds the output of said voltage control amplifier which is obtained through said control switch to the current through said control switch to the current instruction value output from said current instruction generating means in order to obtain a new current instruction value to be input to said current control means.

10. The control apparatus according to claim 8 further comprising:
an input current detecting device for detecting the input current from the AC power supply;
an input current instruction generating circuit which generates an input current instruction;
a first subtractor which subtracts the current value detected by said input current detecting device from the input current instruction value sent from said input current instruction generating circuit;
a current control amplifier which outputs the input voltage instruction according to the output of said first subtractor in order to control the input current;
a second subtractor which subtracts the voltage value detected by said input voltage detecting device from the input voltage value output from said current control amplifier;
a voltage control amplifier which outputs control current according to the output of said second subtractor;
a control switch which is controlled so as to be turned on according to the stop announcement signal output from said stop announcement circuit; and
an adder which adds the output of said voltage control amplifier which is obtained through said control switch to the current instruction value output from said current instruction generating means in order to obtain a new current instruction value to be input to said current control means.

11. The control apparatus according to claim 8 wherein said current instruction value generating means comprises:
an amplitude instruction generating circuit which generates an amplitude instruction for current output from said power converter;
a phase synchronizing circuit which obtains the phase of AC input according to voltage detected by said input voltage detecting device;
an AC sine wave reference oscillating circuit which obtains an AC sine wave reference signal having the same phase as said AC input; and
a multiplier which multiplies said AC sine wave reference signal sent from said AC sine wave reference oscillating circuit by said amplitude instruction sent from said amplitude instruction generating circuit in order to obtain a current instruction value.

12. The control apparatus according to claim 8 wherein said current control means comprises:
a subtractor which obtains the difference between the current instruction value output from said current instruction value control means and the current value detected by said converter current detecting device;
a current control amplifier which obtains the voltage instruction value according to the output of said subtractor in order to control the converter current; and a pulse-width modulating control circuit which transmits the control output for pulse-width-modulation for controlling said power converter according to the voltage instruction value output from said current control amplifier.

13. A power converter control apparatus for controlling a power converter which has a plurality of switching elements and converts AC current to DC current to supply DC output to a load, said control apparatus comprising:

a filter which includes a reactor and a capacitor provided between an AC power supply and said power converter;

a resonance detecting reactor which is provided between said AC power supply and said filter;

an input current detecting device which detects input current flowing into said filter through said resonance detecting reactor;

a capacitor voltage detecting device which detects the capacitor voltage of said filter;

a converter current detecting device which detects converter current flowing into said power converter through said filter;

an input current control means which obtains the input current instruction value according to the detected voltage by said input voltage detecting device and the amplitude instruction and then obtains an output in which the current value detected by said input current detecting device is subtracted from said input current;

a capacitor voltage control means which obtains a capacitor voltage instruction value according to the output of said input current control means and then obtains an output in which the voltage value detected by said capacitor voltage detecting device is subtracted from said capacitor voltage instruction value in order to control the capacitor voltage;

a current control means which obtains a converter current instruction value according to the output of said capacitor voltage control means and then controls switching elements of said power converter according to the output in which the current value detected by said converter current detecting device is subtracted from said converter current value in order to control the converter current; and a stop announcement circuit which outputs a stop announcement signal to said input current control means before said apparatus is stopped and controls the current instruction value for said power converter so as to change said value to zero.

14. The control apparatus according to claim 13 wherein said input current control means comprises:

an amplitude instruction generating circuit which generates an amplitude instruction for current output from said power converter;

a phase synchronizing circuit which obtains the phase of AC input according to voltage detected by said input voltage detecting device;

an AC sine wave reference oscillating circuit which obtains an AC sine wave reference signal having the same phase as said AC input;

a multiplier which multiplies said AC sine wave reference signal sent from said AC sine wave reference oscillating circuit by said amplitude instruction sent from said amplitude instruction generating circuit in order to obtain an input current instruction value; and a subtractor which subtracts the current value detected by said input current detecting device from said input current instruction value.

15. The control apparatus according to claim 13 wherein said capacitor voltage control means comprises:

a current control amplifier which obtains a capacitor voltage instruction value according to the output of said input current control means; and a subtractor which subtracts the voltage value detected by said capacitor voltage detecting device from said capacitor voltage instruction value.

16. The control apparatus according to claim 13 wherein said current control means comprises:

a voltage control amplifier which obtains a converter current instruction value according to the output from said capacitor voltage control means;

a subtractor which subtracts the current value detected by said converter current detecting device from said converter current instruction value;

a current control amplifier which obtains the voltage instruction value according to the output of said subtractor in order to control the converter current; and a pulse-width modulation for controlling the circuit which transmits the control output for pulse-width-modulation for controlling said power converter according to the voltage instruction value output from said current control amplifier.

* * * * *

UNITED STATES PATENT AND TRADEMARK OFFICE
CERTIFICATE OF CORRECTION

PATENT NO. : 5,446,647
DATED : August 29, 1995
INVENTOR(S) : Ikeda et al.

It is certified that error appears in the above-indentified patent and that said Letters Patent is hereby corrected as shown below:

Column 18, Line 4, delete "to the current through said control switch".

Signed and Sealed this

Thirtieth Day of April, 1996

Attest:

BRUCE LEHMAN

Attesting Officer    Commissioner of Patents and Trademarks